Aug. 24, 1943.   G. I. GOODWIN   2,327,884
CLUTCH PLATE
Filed March 29, 1940   2 Sheets-Sheet 1
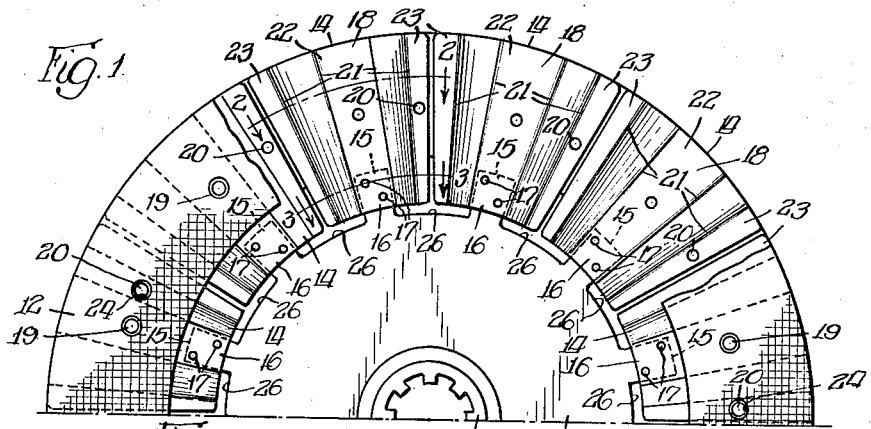
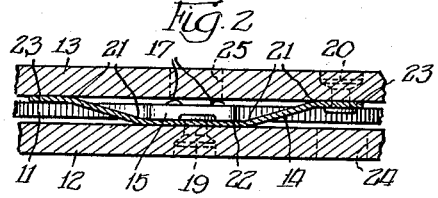
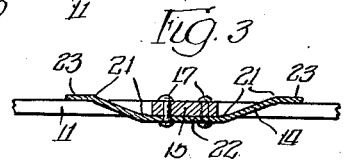
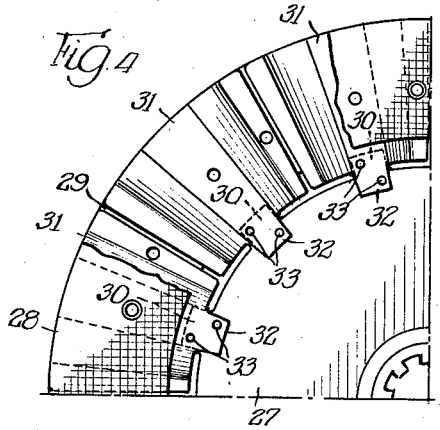
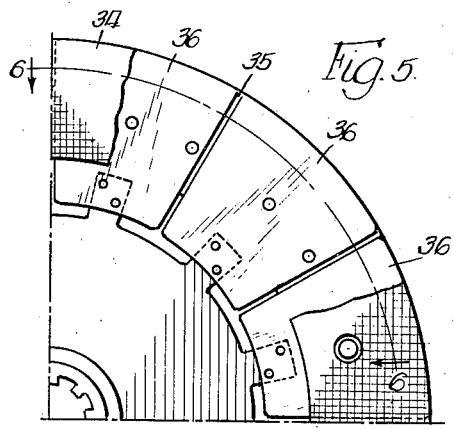
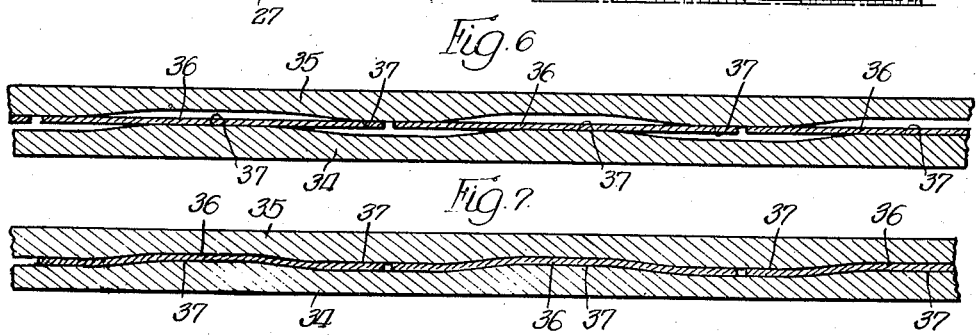
INVENTOR.
George I. Goodwin,
BY Cromwell, Greist & Warden
Attys.

Aug. 24, 1943.   G. I. GOODWIN   2,327,884
CLUTCH PLATE
Filed March 29, 1940   2 Sheets-Sheet 2
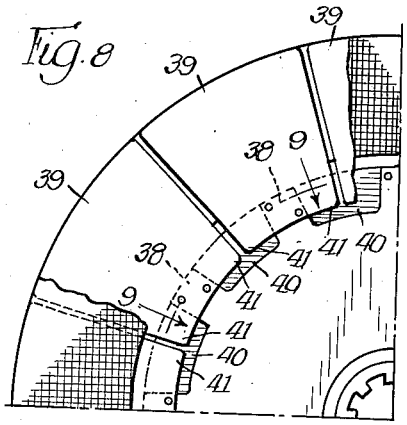
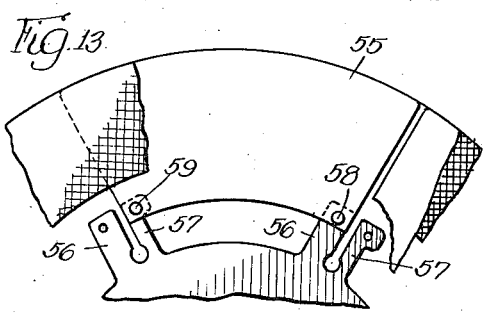
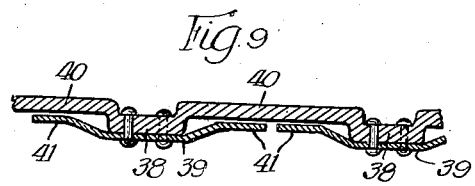
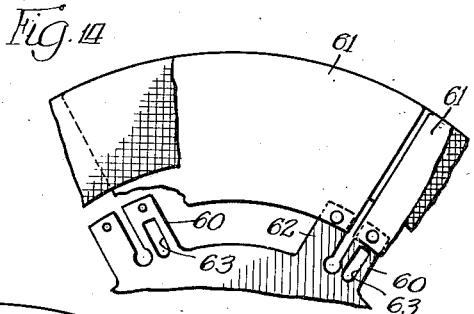
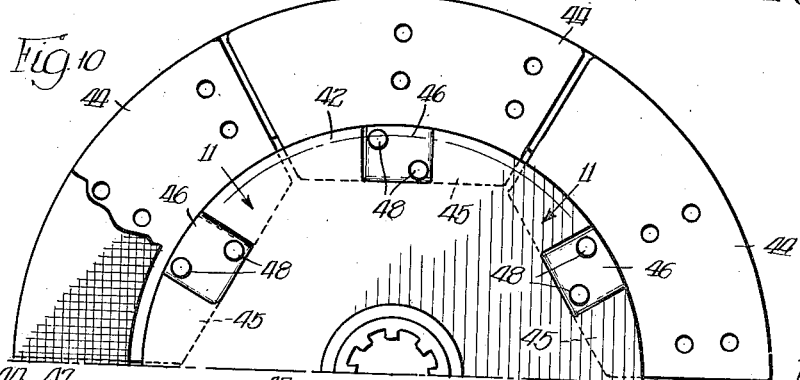
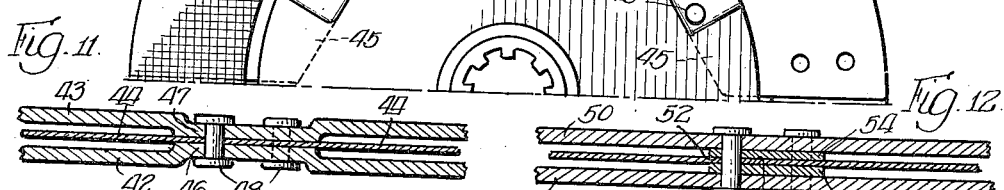
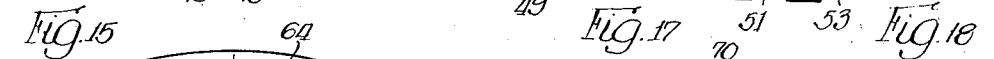
INVENTOR.
George I. Goodwin,
BY Cromwell, Greist & Warden
attys.

Patented Aug. 24, 1943

2,327,884

UNITED STATES PATENT OFFICE 2,327,884

CLUTCH PLATE

George I. Goodwin, Detroit, Mich.

Application March 29, 1940, Serial No. 326,753

15 Claims. (Cl. 192—107)

This invention has to do with clutch plates of the type in which the friction facings are cushioned against relatively thin spring members carried by the center portion of the plate, and is particularly concerned with the shape and mounting of the spring members.

Numerous attempts have been made in the past to produce a satisfactory clutch plate of this type. As it is important that the spinning inertia be kept at a minimum, it has been the practice in producing such plates to employ a disk of considerably smaller size than the facings, and to fasten relatively thin spring segments to the disk in outwardly projecting relation to the edge of the latter, with the projecting portions of the segments laterally crimped or otherwise deformed to provide the requisite cushion for the facings, and with the inner portions of the segments necked down just outwardly of the disk to lap flatly with the latter and provide relatively narrow connections which will keep the disk from interfering with the flexing of the outer portions.

In such plates the necked down portions of the spring segments—which have been considered necessary in connection with segments of the kind in which the metal is bent along straight lines extending between the inner and outer edges of the cushioning portions of the segments—have been found to reduce the strength of the segments to a point where failures have frequently resulted. The necked down portions are inherently weak, both in torque capacity and in axial strength, axial loads being imposed on the same whenever the axial movement of the plate as a whole is resisted by a tight, rusty or rough fit of the spline connection at the center of the plate.

The principal object of the invention is to so shape and mount the spring segments as to eliminate any need for necking down and consequently weakening the attaching portions of the segments, avoid all interference with the mounting disk in obtaining full flexure of the segments, and provide an effective cushioning structure in which the spinning inertia is maintained at a minimum.

Another important object of the invention is to so construct the disk or other cushioning supporting means as to permit of a material reduction in the size of the same to keep down the spinning inertia while affording a form of support for the cushioning means which will in large measure absorb the torsional and axial stresses to which the cushioning means in many previously designed plates of the same general type have been subjected in reduced and consequently weakened areas.

While the foregoing statements are indicative in a general way of the nature and objects of the invention, other more specific objects will be apparent to those skilled in the art upon a full understanding of the improvement.

Several different embodiments of the invention are presented herein for the purpose of exemplification, but it will of course be understood that the invention is susceptible of embodiment in still other structurally modified forms coming equally within the scope of the appended claims.

In the accompanying drawings:

Fig. 1 is a face view of one-half of a clutch plate constructed in accordance with the invention, with a portion of one of the friction facings broken away to expose the underlying spring segments;

Fig. 2 is a fragmentary section, taken on the arcuate line 2—2 of Fig. 1;

Fig. 3 is a similar section, taken on the arcuate line 3—3 of Fig. 1;

Fig. 4 is a face view of one-quarter of another clutch plate, illustrating a modified form of the invention;

Fig. 5 is a similar view, illustrating another modification of the invention;

Fig. 6 is a section, taken on the arcuate line 6—6 of Fig. 5, showing the specially formed facings in their uncompressed condition;

Fig. 7 is a similar section, with the facings in their fully compressed condition;

Fig. 8 is a face view of one-quarter of another clutch plate, illustrating another embodiment of the invention;

Fig. 9 is a section, taken on the arcuate line 9—9 of Fig. 8;

Fig. 10 is a face view of one-half of another clutch plate, illustrating another embodiment;

Fig. 11 is a section, taken on the arcuate line 11—11 of Fig. 10;

Fig. 12 is a section which corresponds to Fig. 11 but shows a further modification;

Figs. 13, 14 and 15 are face views of portions of still other clutch plates, showing further modifications;

Fig. 16 is a section, taken on the arcuate line 16—16 of Fig. 15; and

Figs. 17 and 18 are face views of other modified spring segments.

The clutch plate shown in Figs. 1 to 3 inclusive will first be described. This plate includes a splined hub 10, a centrally apertured disk 11, a pair of annular friction facings 12 and 13, and a number of spring segments 14. The disk 11, which is preferably made of sheet metal, is attached in any suitable manner to the hub 10 and is provided about its outer edge with a number of projections 15. The disk 11 is shown as plain, without any spring center mechanism, but so far as the present invention is concerned the disk may include a spring center mechanism, or not, as desired.

The spring segments 14 are positioned in annular array about the outer edge of the disk 11, in positions between the facings 12 and 13, where they provide an effective cushion for the facings. The segments 14 are of greater radial extent than the facings 12 and 13, and are positioned with their outer edges approximately even with the outer edges of the facings and their inner edges some distance inwardly from the inner edges of the facings. The disk 11 is considerably smaller than the facings, the outer edges of the projections 15 on the disk terminating short of the inner edges of the facings. The inner portions 16 of the segments 14 are lapped with and secured to the projections 15 by rivets 17, while the outer portions 18 of the segments are fastened to the facings 12 and 13 by rivets 19 and 20, the rivets 19 connecting the facing 12 to the segments and the rivets 20 connecting the facing 13 to the segments. The segments are distorted to provide the desired cushion by being curved along straight bend lines 21 extending from their inner to their outer edges, and as a result of such curvature are characterized by flat narrow center sections 22 which continue inwardly into lapped association with the projections 15 and flat narrow edge sections 23, which latter sections are located in a plane which is offset axially of the assembly with respect to the plane of the center sections 22. The center sections 22 are positioned against the back of the facing 12 and carry the rivets 19, while the edge sections 23 are positioned against the back of the facing 13 and carry the rivets 20. The facing 12 is provided with clearance apertures 24 in register with the rivets 20 of the facing 13, while the facing 13 is provided with clearance apertures 25 in register with the rivets 19 of the facing 12. The inner portions 16 of the segments 14 are considerably wider than the projections 15 to which they are attached and extend circumferentially beyond the side edges of the projections into the recesses 26 present between the latter, with the axially offset edge sections 23 of the inner portions 16 of the segments set back into such recesses clear of the edges of the latter.

With such an arrangement there is no need to neck down or otherwise mutilate the segments adjacent their points of attachment, and the segments are consequently better able to withstand the torsional and axial stresses to which subjected, the relatively thick projections 15 on the disk in large measure absorbing such stresses. While the segments 14 have been shown and described as deformed in one particular way, it will of course be appreciated that such segments could be given many other different shapes and forms, well known in the art, without departing from the spirit of the invention.

In the modification shown in Fig. 4 the disk 27 is a little larger in proportion to the size of the facings 28 and 29, the projections 30 on the disk are somewhat shorter, and the spring segments 31 are provided at the centers of their inner edges with small inwardly extending tabs 32 which lap with the disk inwardly of the projections 30 to provide sufficient area for the attaching rivets 33.

In the modification shown in Figs. 5, 6 and 7 the facings 34 and 35 are of special construction, and the spring segments 36 are flat in the uncompressed condition of the plate. The backs of the facings 34 and 35 are of undulated form, with circumferentially spaced high points 37, and with the high points on each facing staggered with respect to those on the other facing. When the facings are pressed together in the operation of the clutch the segments 36 will yield resiliently from the flat condition of the same shown in Fig. 6 to the distorted condition shown in Fig. 7. This particular modification is shown in order to illustrate the fact that so far as the present invention is concerned it is immaterial whether the spring segments are initially bent or initially flat, the improved mounting for the segments being equally effective with either type of segment.

In the modification shown in Figs. 8 and 9 the projections 38 to which the inner portions of the spring segments 39 are attached are formed as embossments, with the intervening portions 40 of the disk offset axially far enough to afford ample clearance for the axially flexing edge portions 41 of the segments.

In the modification shown in Figs. 10 and 11 two disks or side plates 42 and 43 are employed in place of a single disk, and the spring segments 44 are arranged with their inner portions 45 between the side plates. The side plates are spaced apart far enough to permit the required flexure of the segments (which in this particular case are shown as initially flat), and at intervals about the edges of the side plates the latter are provided with confronting embossments 46 and 47 between which the segments are clamped and held by transfixing rivets 48.

Fig. 12 shows a modification which is similar to that shown in Figs. 10 and 11 except for the fact that the side plates 49 and 50 are not embossed and the clamping surfaces 51 and 52 are instead produced by the introduction of separate spacing members 53 and 54, which spacing members are held in place by the transfixing rivets.

In the modification shown in Fig. 13 the spring segments 55, instead of being secured centrally to single projections on the disk, are each secured to two circumferentially spaced projections 56 and 57 by rivets 58 and 59. The projections 56 are wider and consequently stronger than the projections 57, the latter being purposely made sufficiently limber to yield circumferentially and move with the attaching corners of the segments as the latter expand and contract under flexure.

The modification shown in Fig. 14 is somewhat similar to that shown in Fig. 13. In this modification limber projections 60 are again provided for corresponding corners of the segments 61, but the projections 60 are made as wide as the rigid projections 62 and are rendered limber by the provision of cutouts 63.

The modification shown in Figs. 15 and 16 is also somewhat similar to the modifications shown in Figs. 13 and 14 except that the projections for the attachment of the inner corners of the segments 64 are formed as embossed portions 65 within the edge of the mounting disk 66 and the rigidly held corners of the segments are secured by tightly fitted rivets 67 while the yieldably held corners are slidingly supported by shoulder rivets 68 operating in elongated slots 69 in the segments.

Fig. 17 shows a still further modified spring segment 70 which, like the segments shown in Figs. 13 to 16 inclusive is adapted to be attached at its inner corners to the mounting disk, by rivets passing through holes 71 and 72. In this particular segment, however, circumferential expansion and contraction of the segment is permitted by rendering the corner 73 limber adjacent the rivet hole 72 by the introduction of suitable cutouts 74.

The modified spring segment shown in Fig. 18 is adapted for attachment in substantially the same manner as the segment shown in Fig. 17, the main body portion 75 of the segment being permitted to move circumferentially with respect to the attaching corner 76 during flexing of the segment by the introduction of a deep slot 77.

From the foregoing it will be obvious that the improvement which forms the subject matter of this invention may be embodied in a great many different structural forms and combinations and that the herein described forms are merely intended to typify a few such embodiments.

I claim:

1. In a clutch plate, a pair of annular friction facings, a disk of smaller size than the facings, and a number of relatively thin spring segments projecting outwardly from the outer edge of the disk into positions between the facings, with the inner portions of the segments attached to the disk and the outer portions of the same attached to the facings, said segments being flexible along bend lines extending between the inner and outer edges of the segments, and said disk being provided with a number of radial projections of considerably less width than the inner portions of the segments, to which said inner portions are attached at their centers only, whereby to permit flexure of the side portions of the segments throughout their radial extent without interference from the disk.

2. In a clutch plate, a pair of annular friction facings, a disk provided with a number of circumferentially spaced projections which terminate short of the facings, and cushioning means for the facings carried by the projections.

3. In a clutch plate, a pair of annular friction facings, a disk which is smaller than the openings in the facings and is provided with a number of circumferentially spaced projections which terminate short of the facings, leaving recesses at opposite sides of the projections between the outer edge of the disk and the inner edges of the facings, and cushioning means for the facings carried by the projections, with the inner portions of the cushioning means extending circumferentially beyond the side edges of the projections for resilient flexing operation in the recesses present between the latter.

4. In a clutch plate, a pair of annular friction facings, a disk provided with a number of circumferentially spaced projections which terminate short of the facings, and cushioning means for the facings carried by the projections, with the inner portions of the cushioning means extending circumferentially beyond the side edges of the projections and axially into the recesses present between the latter.

5. In a clutch plate, a pair of annular friction facings, a disk provided with a number of circumferentially spaced projections which terminate short of the facings, and cushioning means for the facings carried by the projections, said cushioning means being divided into a number of segments.

6. In a clutch plate, a pair of annular friction facings, a disk provided with a number of circumferentially spaced projections which terminate short of the facings, and cushioning means for the facings carried by the projections, said cushioning means being divided into a number of segments, and said projections spanning but relatively small portions of the inner edges of the segments.

7. In a clutch plate, a pair of annular friction facings, a disk provided with a number of circumferentially spaced projections which terminate short of the facings, and a number of spring segments carried by the projections for cushioning the facings.

8. In a clutch plate, a pair of annular friction facings, a disk provided with a number of circumferentially spaced projections which terminate short of the facings, and a number of spring segments carried by the projections for cushioning the facings, said segments being attached to the projections in lapped relation to the latter, with the inner edges of the segments located outwardly of the outer edge of the disk proper.

9. In a clutch plate, a pair of annular friction facings, a disk provided with a number of circumferentially spaced projections which terminate short of the facings, and cushioning means for the facings carried by the projections, said cushioning means being resiliently flexible and being held by the projections against axial movement at their points of attachment.

10. A driven clutch plate having a hub, an intermediate annulus operatively connected thereto, said annulus having at its outer edge a plurality of projections, resiliently yieldable segments attached to the projections, the segments together forming an interrupted cushioning ring, and friction facings secured to the opposite surfaces of the segments.

11. In a clutch plate, a pair of annular friction facings, a disk provided with a number of circumferentially spaced projections which terminate short of the facings, and circumferentially waved cushioning means for the facings carried by the projections.

12. In a clutch plate, a pair of annular friction facings, a disk provided with a number of circumferentially spaced projections which terminate short of the facings, and circumferentially waved cushioning means for the facings carried by the projections, said cushioning means being divided into a number of segments.

13. In a clutch plate, a pair of annular friction facings, a disk provided with a number of circumferentially spaced projections which terminate short of the facings, and a number of circumferentially waved spring segments carried by the projections for cushioning the facings.

14. In a clutch plate, a pair of annular friction facings, a disk provided with a number of circumferentially spaced projections which terminate short of the facings, and cushioning means for the facings carried by the projections, said cushioning means being resiliently flexible and axially distorted in the uncompressed condition of the plate and being held by the projections against axial movement at their points of attachment.

15. A driven clutch plate having a hub, an intermediate annulus operatively connected thereto, said annulus being substantially rigid and having at its outer edge a plurality of projections, resiliently yieldable segments attached to the projections, the segments being circumferentially waved and together forming an interrupted cushioning ring, and friction facings secured to the opposite surfaces of the segments.

GEORGE I. GOODWIN.